(12) United States Patent (10) Patent No.: US 12,632,498 B1
Sliwinski et al. (45) **Date of Patent: *May 19, 2026**

(54) SYSTEMS AND METHODS FOR OPTIMIZING SEARCH RESULT GENERATION

(71) Applicant: Trusted, Inc., San Francisco, CA (US)

(72) Inventors: Lennie Sliwinski, San Francisco, CA (US); Farid Aliev, San Francisco, CA (US); Samuel Zachary Scott, San Francisco, CA (US)

(73) Assignee: Trusted, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/892,237

(22) Filed: Sep. 20, 2024

Related U.S. Application Data

(63) Continuation of application No. 18/153,322, filed on Jan. 11, 2023, now Pat. No. 12,124,511, which is a continuation of application No. 17/302,493, filed on May 4, 2021, now Pat. No. 11,580,161, which is a continuation of application No. 17/173,154, filed on Feb. 10, 2021, now Pat. No. 11,036,798.

(60) Provisional application No. 62/972,529, filed on Feb. 10, 2020.

(51) Int. Cl.
*G06F 16/901* (2019.01)
*G06F 16/903* (2019.01)

(52) U.S. Cl.
CPC ...... *G06F 16/901* (2019.01); *G06F 16/90335* (2019.01)

(58) Field of Classification Search
CPC .......................... G06F 16/901; G06F 16/90335
USPC .......................................................... 707/715
See application file for complete search history.

(56) References Cited

U.S. PATENT DOCUMENTS

| | | | | |
|---|---|---|---|---|
| 5,913,214 | A * | 6/1999 | Madnick | ............ G06F 16/2452 |
| 2005/0102271 | A1 * | 5/2005 | Robertson | ........... G06F 16/2228 |
| 2017/0061014 | A1 | 3/2017 | Heiler et al. | |
| 2020/0364223 | A1 | 11/2020 | Pal et al. | |

* cited by examiner

*Primary Examiner* — Cam Y T Truong
(74) *Attorney, Agent, or Firm* — Knobbe, Martens, Olson & Bear, LLP

(57) ABSTRACT

Generally described, one or more aspects of the present application relate to data search system that can facilitate data searches such that the amount of computing resources such as processing power and bandwidth used to generate and output search results is reduced. For example, in response to a search request specifying a set of search criteria, the data search system may identify a combination of sub-criteria, access a pre-generated threshold corresponding to the combination of sub-criteria, determine a real-time index value corresponding to the combination of sub-criteria, identify a plurality of resources that satisfy the set of search criteria, and output a subset of the plurality of resources to the user computing device from which the search request was received.

20 Claims, 6 Drawing Sheets

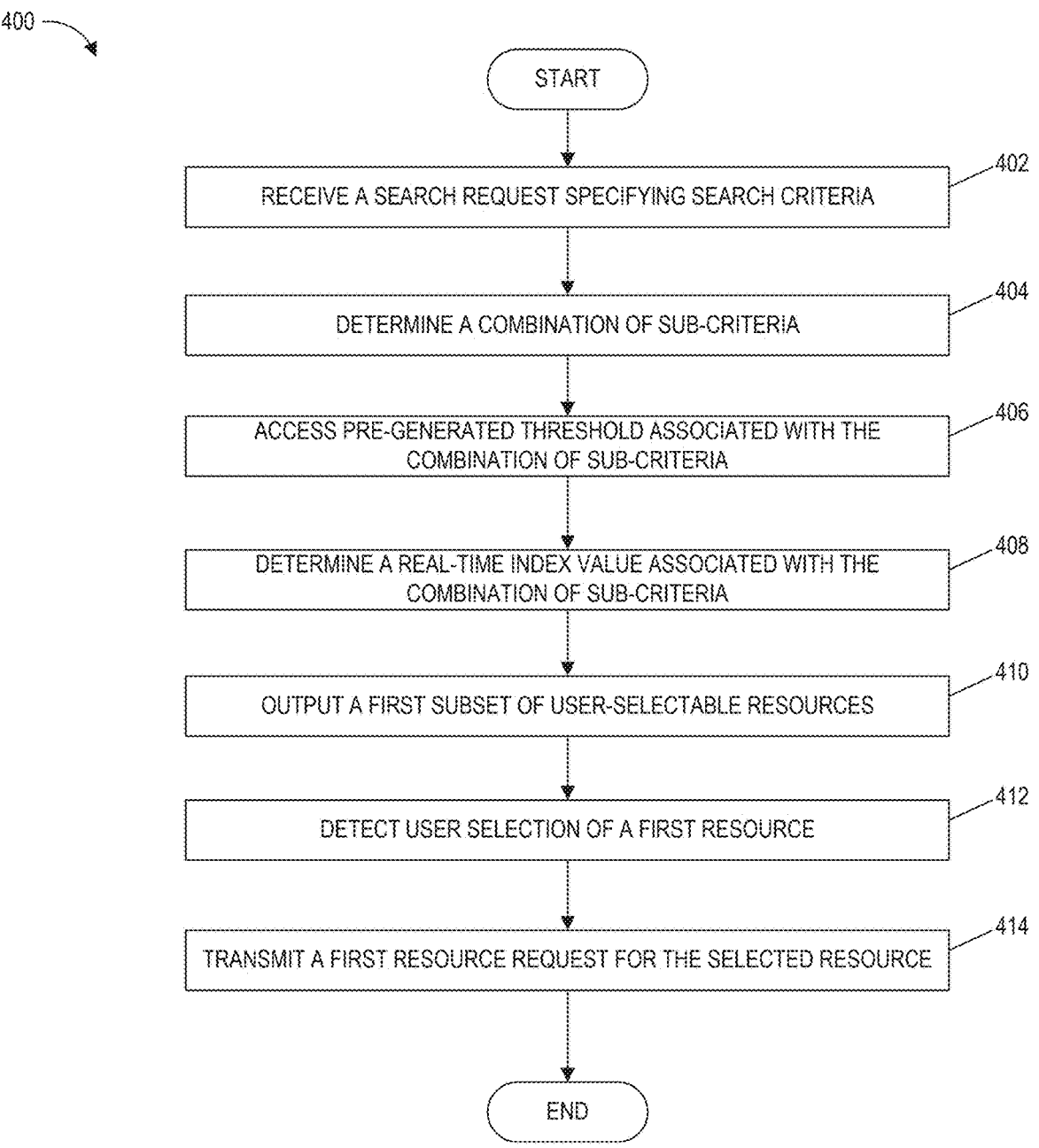

OUTPUTTING A SET OF USER-SELECTABLE RESOURCES IN RESPONSE TO A SEARCH REQUEST

400

START

RECEIVE A SEARCH REQUEST SPECIFYING SEARCH CRITERIA — 402

DETERMINE A COMBINATION OF SUB-CRITERIA — 404

ACCESS PRE-GENERATED THRESHOLD ASSOCIATED WITH THE COMBINATION OF SUB-CRITERIA — 406

DETERMINE A REAL-TIME INDEX VALUE ASSOCIATED WITH THE COMBINATION OF SUB-CRITERIA — 408

OUTPUT A FIRST SUBSET OF USER-SELECTABLE RESOURCES — 410

DETECT USER SELECTION OF A FIRST RESOURCE — 412

TRANSMIT A FIRST RESOURCE REQUEST FOR THE SELECTED RESOURCE — 414

END

*FIG. 4*

DETECTING A REAL-TIME CHANGE AND OUTPUTTING AN UPDATED SET OF USER-SELECTABLE RESOURCES

500

START

DETECT A REAL-TIME CHANGE IN A DATASET — 502

ADJUST A REAL-TIME INDEX VALUE TO REFLECT THE REAL-TIME CHANGE — 504

OUTPUT A SECOND SUBSET OF USER-SELECTABLE RESOURCES — 506

DETECT USER SELECTION OF A SECOND RESOURCE — 508

TRANSMIT A SECOND RESOURCE REQUEST FOR THE SELECTED RESOURCE — 510

END

SYSTEMS AND METHODS FOR OPTIMIZING SEARCH RESULT GENERATION

INCORPORATION BY REFERENCE TO ANY PRIORITY APPLICATIONS

This application is a continuation of U.S. patent application Ser. No. 18/153,322, filed Jan. 11, 2023, which is a continuation of U.S. patent application Ser. No. 17/302,493, filed on May 4, 2021, which is a continuation of U.S. patent application Ser. No. 17/173,154, filed on Feb. 10, 2021, which claims priority to U.S. Provisional Application No. 62/972,529, filed on Feb. 10, 2020, the disclosures of which are incorporated herein by reference in their entirety for all purposes. Any and all applications for which a foreign or domestic priority claim is identified in the Application Data Sheet as filed with the present application are hereby incorporated herein by reference in their entirety under 37 CFR 1.57 for all purposes.

TECHNICAL FIELD

This disclosure relates to the field of managing search queries to datasets and generating search results, and particularly to techniques for facilitating generation and transmission of search results between computing devices within in a network environment.

BACKGROUND

Many types of computing devices, such as computers, mobile phones, and tablet devices, are used to submit search queries on large datasets and return search results that match the search queries. Depending on the size of the datasets and the processing and networking capabilities of the computing devices (both on the user side and the server side), finding the most relevant information in such datasets can be very time-consuming (e.g., the latency associated with generating and returning the search results combined with the time required to go through the search results). Thus, more efficient techniques for generating and outputting search results are desired.

BRIEF DESCRIPTION OF THE DRAWINGS

FIG. 4 is a flowchart of an example process for outputting a set of user-selectable resources in response to a search request, in accordance with aspects of the present disclosure.

DETAILED DESCRIPTION

Introduction

Figure 1:
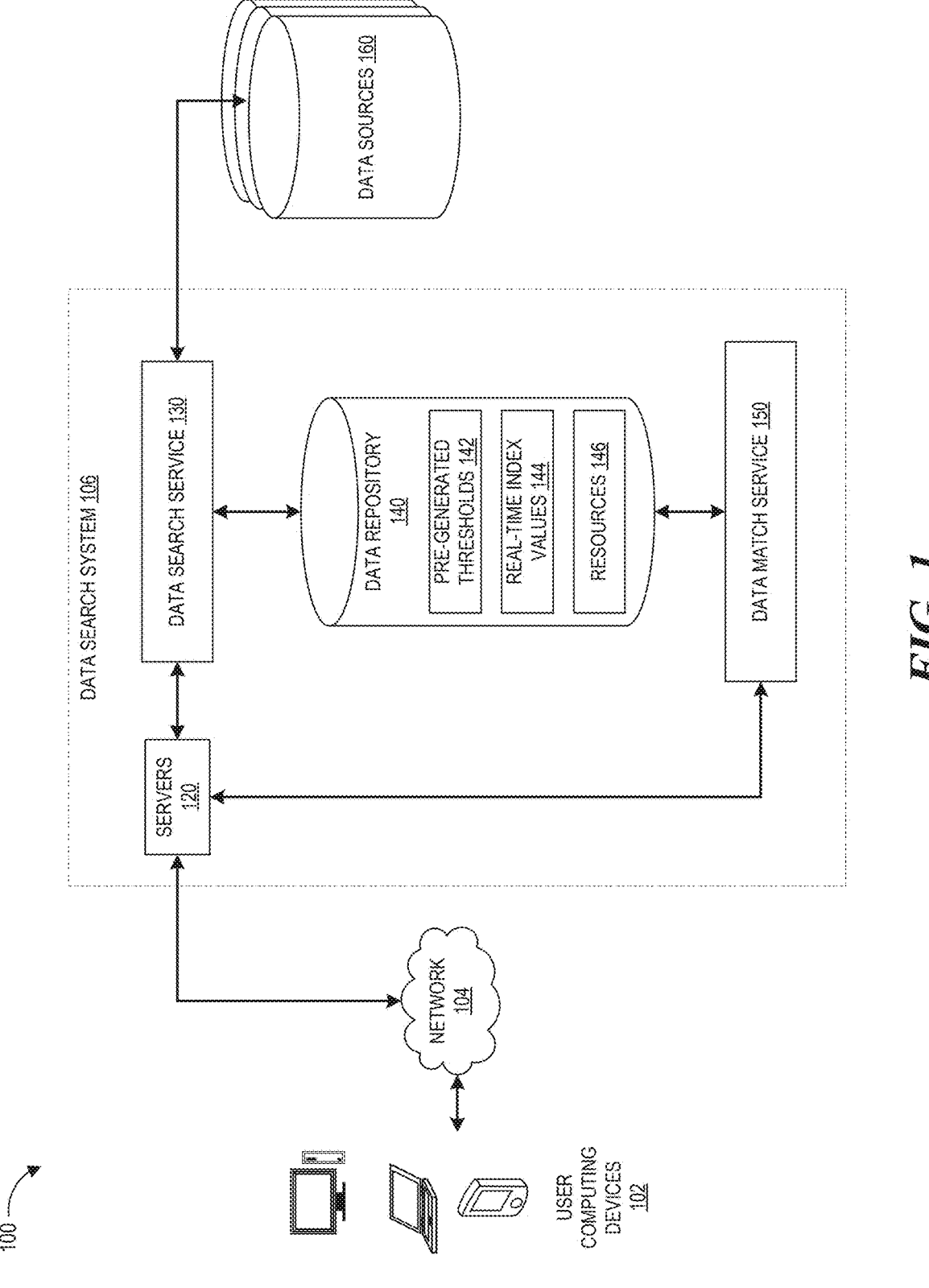
FIG. 1 depicts a schematic diagram of a network environment in which a data search system is used to implement a data search service and a data match service in accordance with aspects of the present disclosure.

The present disclosure generally relates to improving the process of searching for resources in a dataset in a network environment. Many types of computing devices, such as computers, mobile phones, and tablet devices, are used to submit search queries on large datasets and return search results that match the search queries. Depending on the size of the datasets and the processing and networking capabilities of the computing devices (both on the user side and the server side), finding the most relevant information in such datasets can be very time-consuming (e.g., the latency associated with generating and returning the search results combined with the time required to go through the search results). Thus, more efficient techniques for generating and outputting search results are desired.

The aforementioned challenges, among others, are addressed in some embodiments by the disclosed techniques for facilitating data searches such that the amount of computing resources such as processing power and bandwidth used to generate and output search results is reduced. More specifically, the presently disclosed technology addresses these deficiencies by pre-generating a set of thresholds that can be used to quickly determine whether a data object or resource in the dataset satisfies the search criteria or requirements specified by a search request and can thus be returned to the requesting user as part of the search result. Since the data objects or resources in the dataset can change over time, some parameters (e.g., parameters that do not vary wildly over time or become outdated relatively quickly) that are used to perform the searches can be pre-generated in advance of receiving search requests, thereby reducing computing resource consumption and latency, and other parameters (e.g., parameters that change in real time or become outdated relatively quickly) can be determined in response to receiving such search requests, thereby preserving the real-time nature of the data search system (as opposed to outputting search results based on outdated parameters).

As will be appreciated by one of skill in the art in light of the present disclosure, the embodiments disclosed herein improve the ability of computing systems, such as data search systems, database systems, data storage systems, computing resource management systems, etc., to provide more efficient data search techniques. By utilizing the pre-generated thresholds for different combinations of sub-criteria usable to generate the search results, the data search system of the present disclosure can address the deficiencies described above.

Prior techniques generally relied on caching search results based on potential search criteria. However, such approaches would not account for the real-time changes in the underlying dataset and may return outdated or incomplete search results. In contrast, embodiments of the present disclosure enable the data search system to maintain a set of pre-generated thresholds usable to quickly determine whether a data object or resource in the dataset satisfies the search criteria or requirements specified by a search request, thereby reducing computing resource consumption and latency, while still allowing real-time determinations of parameters that reflect the real-time characteristics of the data object or resource, thereby allowing more up-to-date and accurate search results.

The presently disclosed embodiments therefore address technical problems inherent within computing systems, such as the latency and computing resource cost associated with performing data searches in a data search system. These technical problems are addressed by the various technical solutions described herein, including pre-generation of thresholds, identification of specific combinations of sub-criteria usable to focus the searches, real-time determination of index values for such combinations of sub-criteria usable to identify the objects or resources to be outputted to the user, and selecting a subset of identified objects or resources that are most relevant to the particular data search. Thus, the present disclosure represents an improvement on existing data search systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Data Search System

The illustrative network environment 100 shown in FIG. 1 includes a data search system 106 according to one embodiment. The data search system 106 enables a user to search for and request various data objects or resources provided via the data search system 106. The user may submit a search query specifying a set of search criteria to the data search system 106, and in response, the data search system 106 may output a set of data objects or resources that the user can utilize or consume and/or request access to (e.g., to the owner of such data object or resource, which may be the data search system 106 or an external entity). In some embodiments, the resources may each be of limited supply (for example, only a limited number of searching users may be able to utilize a particular resource) or unique (for example, there may be only one of each resource), as opposed to a digitally consumable item that may be copied, accessed or utilized an effectively unlimited number of times. In such embodiments in which the searched resources are each limited resources, it may be desirable to utilize aspects of the present disclosure to not necessarily simply return the most relevant resources to specific search criteria provided by a user (such as may occur in many prior art search systems, such as an Internet search engine in which every user is able to access the same webpage that is most relevant to a common search query), but for the data search system to consider other factors described herein that take into account the limited nature of the resources being searched. While the resources themselves may be limited, the resources may be represented by data objects or data records that are searched, and which may have corresponding information displayed to a user prior to the user's decision whether to utilize or attempt to utilize the underlying limited resource itself.

By way of illustration, various example user computing devices 102 are shown in communication with the data search system 106 via network 104. The user computing devices 102 can be any computing device such as a desktop, a laptop, a mobile phone (or smartphone), a tablet, a kiosk, a television, a wristwatch (including a smartwatch), a wireless device, a media player, one or more processor devices, integrated circuit components for inclusion in computing devices, and the like.

The network 104 over which the user computing devices 102 can access the data search system 106 may be any wired network, wireless network, or combination thereof. In addition, the network 104 may be a personal area network, local area network, wide area network, over-the-air broadcast network (for radio or television, for example), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks.

In the depicted embodiment, the data search system 106 includes servers 120, which can communicate with the user computing devices 102 over the network 104 and provide access to various services of the data search system 106. In the example of FIG. 1, the services provided by the data search system 106 include a data search service 130 and a data match service 150. In some embodiments, these services can be implemented as software components executing in physical computer hardware on the servers 120 or in separate computing devices.

The data search system 106 may provide user interfaces (and/or instructions therefor) for display upon the user computing devices 102, for example, via a navigation and/or browsing interface such as a browser or application installed on the user computing devices 102, and the users on the user computing devices 102 may utilize the various services provided by the data search system 106 such as the data search service 130 and the data match service 150 via the user interfaces.

The data search service 130 can access data sources 160, collect datasets, and make the datasets available for searching by the user computing devices 102. The datasets collected from the data sources 160 may indicate or identify one or more resources that can be made searchable on the data search system 106. For example, the datasets may include a plurality of data entries that each correspond to a resource that can be searched by a user of the data search system 106 and/or requested by the user of the data search system 106. The collected datasets may be processed and stored in the data repository 140 (e.g., as resources 146). The data sources 160 may provide application programming interfaces (APIs) that may be called by the data search service 130 to access the data stored thereon. In other embodiments, the data sources 160 may allow data to be downloaded as a file. The data search service 130 may store the data accessed from the data sources 160 in the data repository 140. In some embodiments, the data search service 130 may parse and analyze the data before storing the data in the data repository 140 as searchable, user-selectable resources 146. The data search service 130 may periodically access a predefined set of third party systems or other data sources to collect additional data and to update the data repository 140 based on any additional data. Some or all of the data described herein can be stored in a database format (SQL, for example). In some embodiments, at least some of the data described herein is stored in a blockchain format (as a blockchain ledger, for example). Although the data sources 160 are shown outside the data search system 106, in some embodiments, some or all of the data sources 160 may be implemented within the data search system 106.

The data repository 140 may store pre-generated thresholds 142, real-time index values 144, and resources 146. The pre-generated thresholds 142 may be thresholds that are used by the data search system 106 to determine whether a given resource in the dataset being searched satisfies the search criteria specified by incoming search requests. The real-time index values 144 may be values that are determined based on the incoming search requests and are compared to the pre-generated thresholds 142 to determine whether a given resource in the dataset being searched satisfies the search criteria specified by incoming search requests. For example, if the real-time index value 144 determined for a given resource in the dataset exceeds the pre-generated threshold 142 for the given resource, then the data search system 106 may return the given resource as part of the search result. In some embodiments, the pre-generated thresholds 142 are determined based on parameters that are less prone to change and are relatively static over time, and the real-time index values are determined based on parameters that are more prone to change and are relatively dynamic over time. In some embodiments, in response to receiving a search request from a user, in order to generate the search result to be returned to the user, the data search system 106 uses a pre-generated threshold 146 that was generated prior to the receipt of the search request but uses a real-time index value 144 that was generated after the receipt of the search request and/or generated using the information included in or indicated by the search request.

In some embodiments, a pre-generated threshold 146 defines the range of the real-time index value that a particular resource or a set of resources needs in order to be included in the search result to be returned to the user. If a given resource or set of resources has a high threshold, the given resource or set of resources may need a high real-time index value in order for the resource or set of resources to be considered for inclusion in the search result. For example, the threshold may represent how desirable a resource may be to a user, and the real-time index may represent how popular, competitive, or in demand a resource may be. If a resource is desirable, it may be more likely to be selected by the user upon presentation in the search result. If a resource is popular, competitive, or in high demand, the resource may be less likely to be granted to the user upon the user's selection. Depending on how the thresholds and index values are configured in the data search system 106, the comparison may be reversed. In the computing resource example, the same virtual machine cannot be rented to two different users (e.g., unless multitenancy is allowed), and if only the most highly contested or sought-after virtual machines are presented in the search result, the user may not have a high rate of success in actually obtaining the requested resource. Thus, balancing the desirability against demand levels may facilitate more efficient search and distribution of limited resources and thereby improve user experience.

In some embodiments, the resources 146 can be a computing resource such as CPU, disk, storage, memory, network bandwidth, and/or virtual or physical machines that can be accessed by the first user of the first user computing device, upon the first user's resource request transmitted to the second user computing device being granted by the second user (e.g., owner of the resource). In other embodiments, the resources 146 can be data objects (e.g., data stored in a database, data stored in a data storage volume, data stored in a data storage device, etc.) that can be accessed by the first user of the first user computing device, upon the first user's resource request transmitted to the second user computing device being granted by the second user (e.g., owner of the resource). In yet other embodiments, the resources 146 can be tasks, services (e.g., physical or virtual), jobs, positions, or human or capital resources that can be performed or provided by the first user of the first user computing device, upon the first user's resource request transmitted to the second user computing device being granted by the second user (e.g., owner of the resource). Alternatively, the resources 146 can be tasks, services (e.g., physical or virtual), jobs, positions, or human or capital resources that can be performed or provided by the second user of the second user computing device, upon the first user's resource request transmitted to the second user computing device being granted by the second user (e.g., owner of the resource).

As used herein, the term "resource," in addition to having its ordinary meaning, is used interchangeably to refer to a resource itself (e.g., a particular product, service, any of the items referred to above, or the like) and to its description or representation in a computer system (e.g., in the context of computing resources, the actual computing resource searchable as a resource via the data search system 106 such as units of CPU, memory, etc. may not be stored in the data repository 140 but its representation that includes information about the computing resource may instead be stored in the data repository 140, for example, as a data entry or data object). As will be apparent from the context in which it is used, the term "resource" is also sometimes used herein to refer only to the resource itself (e.g., requesting a resource, utilizing a resource, etc.) or only to its representation in the computer system (e.g., storing a resource, including a resource in the search result returned to the user, etc.).

In some embodiments, a pre-generated threshold 142 may be separately generated for each pre-determined combination of search criteria (or sub-criteria) that may be specified by a future incoming search request. For example, in the case where the search request aims to identify computing resources (e.g., CPU, memory, disk, network, etc.) that can be accessed by the user computing device 102, the search request may specify, as its search criteria, geographical preferences or requirements (e.g., that the physical machines hosting the computing resources should be located in the United States), the amount of computing resources preferred or required (e.g., that the computing resources should include at least 4 GBs of CPU and 32 GBs of memory), and/or cost preferences or requirements (e.g., that the computing resources should not cost more than $100/month), to name a few categories of search criteria. In such a case, the dataset being searched may include a plurality of resources, where each resource is associated with data or metadata that indicates or describes the characteristics of the resource (e.g., one resource may be associated with data or metadata that indicates that a physical machine located in FL is hosting 4GBs of CPU and 32 GBs of memory, costs $80/month, has an average monthly uptime of 99.99%, and has an average latency of 100 ms, and another resource may be associated with data or metadata that indicates that a physical machine located in CA is hosting 6 GBs of CPU and 36 GBs of memory and costs $105/month, has an average monthly uptime of 99.999%, and has an average latency of 20 ms). Such data or metadata may be stored in the data repository 140 along with the corresponding resource 146. In this example, a pre-generated threshold 142 that is pre-generated for a resource (or a group of resources) may indicate, for a set of resources that satisfy a combination of sub-criteria that satisfies the search criteria associated with a search request, how likely it is for any one (or subset) of the resources to be selected by the data search system 106 for inclusion in a search result returned to the user computing device 102 in response to the search request and/or how likely it is to be for any one (or subset) of the resources to be selected by the user computing device 102 once presented in the search result.

In some embodiments, the pre-generated threshold 142 corresponding to a combination of sub-criteria is a value that is compared to the real-time index value 144 corresponding to the combination of sub-criteria. Depending on the result of the comparison (e.g., threshold 142 is greater than index value 144, threshold 142 is less than index value 144, threshold 142 is within a predetermined percentage of index value 144, etc.), one or more resources to be included in the search result returned to the user may be selected from the set of resources satisfying the combination of sub-criteria (which may be a subset of the resources satisfying the search criteria specified by the search request).

For example, the pre-generated threshold may be an average cost associated with using, leasing, or acquiring a unit of computing resource (e.g., CPU, memory, disk, network, etc.). In such an example, the pre-generated threshold may be generated for each combination of resource location (e.g., CA, FL, OH, etc.) and each computing resource provider (company A, company B, etc.) (or any other sub-criteria that may be used to determine whether a search criteria specified in the search request is satisfied) for use in connection with a future search request. When a search request is received, the data search system 106 may identify the combinations of sub-criteria for which pre-generated thresholds 142 that also satisfy the search criteria specified by the search request. For example, in response to receiving a search request that requires that the computing resources be provided by company A (e.g., regardless of location of physical servers), the data search system 106 can quickly access (i) the pre-generated threshold 142 pre-generated for the combination of CA and company A ("sub-criteria X"), (ii) the pre-generated threshold 142 pre-generated for the combination of FL and company A ("sub-criteria Y"), and (iii) the pre-generated threshold 142 pre-generated for the combination of OH and company A ("sub-criteria Z"), and determine which sub-criteria can be used to identify resources to be included in the search result. If the pre-generated threshold for sub-criteria Y would be the most desirable to the user (e.g., by having the lowest average cost), one or more resources to be included in the search result may be selected from those that satisfy the sub-criteria Y (e.g., CPU/memory provided by company A and implemented in OH). As another example, in response to receiving a search request that requires that the computing resources be implemented in CA, the data search system 106 can quickly access the pre-generated threshold 142 pre-generated for sub-criteria X and also the pre-generated threshold 142 pre-generated for the combination of CA and company B, and determine which sub-criteria can be used to identify resources to be included in the search result. By doing so, the data search system 106 can quickly identify subsets of resources and determine how useful or desirable such subsets of resources would be in responding to the search request, without having to check all those resources that satisfy the search criteria specified by the search request. Here, a lower average cost per unit of computing resource associated with a given computing resource may indicate that the given computing resource is more likely to be presented to the user searching for computing resource (or more desirable to the user and/or more likely to be selected by the user once presented in the search result).

As another example, the pre-generated threshold may be a ratio of the average latency associated with the computing resource to the average uptime associated with the computing resource. Similarly, the pre-generated threshold may be generated for each combination of resource location (e.g., CA, FL, OH, etc.) and each computing resource provider (company A, company B, etc.) (or any other sub-criteria that may be used to determine whether a search criteria specified in the search request is satisfied) for use in connection with a future search request. Here, a lower ratio of the average latency to the average uptime may indicate that the given computing resource is more likely to be presented to the user searching for computing resource. Although resource location and resource provider are used as examples of sub-criteria, in other embodiments, the combinations of sub-criteria used to generate the pre-generated threshold 142 may be more granular (e.g., including 3, 4, 5, or 10 different sub-criteria).

In some embodiments, the search request may specify the user's preference for optimizing the search result. For example, the search request may indicate that the user wishes to lease a certain number of virtual machines while minimizing the cost. As another example, the search request may indicate that the user wishes to lease a certain number of virtual machines while maximizing the average uptime. As yet another example, the search request may indicate that the user wishes to find a position that meets the user's specified schedule while maximizing pay. As yet another example, the search request may indicate that the user wishes to find a position that fits the user's qualifications while minimizing commute.

In some embodiments, the user's preference specified in the search request may be used to determine the desirability of a given resource for inclusion in the search result. For example, if the search request specifies that the cost of CPUs should be minimized, the data search system 106 may identify the pre-generated thresholds 142 that not only satisfy the search criteria specified by the search request but also indicate or use the resource cost or CPU cost as a metric. For example, if a first plurality of pre-generated thresholds 142 were generated for average CPU cost (for a plurality of combinations of sub-criteria), and a second plurality of pre-generated thresholds 142 were generated for average uptime (for a plurality of combinations of sub-criteria), and the search request specifies of the user's preference for minimizing (or lower) cost, the data search system 106 may access the first plurality of pre-generated thresholds 142 generated for average CPU cost and compare them to identify the set or subset of resources to be included in the search result to be returned to the user.

As described above, the data search system 106 may determine a plurality of combinations of sub-criteria (e.g., geographical regions of CA, FL, OH, etc. that all fall under "United States") and pre-generate a separate threshold (e.g., generate the threshold prior to a search request for which the pre-generated threshold is to be used) for each of such combination of sub-criteria in the plurality of combinations of sub-criteria. For example, the data search system 106 may generate a threshold for the computing resources implemented using physical machines located in California, another threshold for the computing resources implemented using physical machines located in Florida, another threshold for the computing resources implemented using physical machines located in Ohio, and so on.

Subsequent to this pre-generation, an incoming search request may be received by the data search system 106. In response to such a search request, the data search system 106 may generate one or more real-time index values 144. In the computing resource examples above, for a given resource, a real-time index value 144 may indicate a projected rate of success in actually obtaining the given resource. For example, one type of computing resource 146 currently indicated as being available on the data search system 106 may be in high demand and may be more difficult to obtain by the user searching for computing resource (e.g., 5 units of this particular resource are available, but 100 users of the data search system 106 may be currently searching for and/or requesting this particular resource or another resource similar to this particular resource), and another type of computing resource 146 currently indicated as being available on the data search system 106 may be in low demand and may be easier to obtain by the user searching for computing resource (e.g., 20 units of this particular resource are available, but 10 users of the data search system 106 may be currently searching for and/or requesting this particular resource or another resource similar to this particular resource). The real-time index value 144 may be used to identify a set of resources 146 that satisfy the search criteria specified by a search request from a user, and/or to further select, from the identified set of resources, a subset of resources to be included in the search result returned to the user.

The resource access or usage by the first user may be associated with a specific duration, and at the end of the duration, the access or usage may be renewed at the request of the first user, the second user, or both. The resources 146 may be associated with data or metadata indicating the requirements or criteria for access or usage (or for requesting such access or usage) that are specified by the owner of the resource or by the data search system 106.

The data match service 150 may implement a two-way data matching method in which the data match service 150 determines (i) whether a first user's data satisfies a second user's search criteria, and (ii) whether the second user's resource satisfies the first user's search criteria. If both of these determinations are positive, the second user's resource may be presented to the first user for user selection and further submission of usage or access request of the second user's resource.

The data search system 106 is depicted in FIG. 1 as operating in a distributed computing environment including several computer systems that are interconnected using one or more computer networks. The data search system 106 could also operate within a computing environment having a fewer or greater number of devices than are illustrated in FIG. 1. Thus, the depiction of data search system 106 in FIG. 1 should be taken as illustrative and not limiting to the present disclosure. For example, the data search system 106 or various constituents thereof could implement various Web services components, hosted or "cloud" computing environments, and/or peer-to-peer network configurations to implement at least a portion of the processes described herein.

Further, the data search system 106 and its components may be implemented in hardware and/or software and may, for example, include one or more physical or virtual servers implemented on physical computer hardware configured to execute computer executable instructions for implementing the various features described herein. The one or more servers may be geographically dispersed or geographically co-located, for example, in one or more data centers. In some embodiments, one or more of the components shown in FIG. 1 may be implemented on one or more virtual servers or virtual machines.

Moreover, the processing of the various components or services of the data search system 106 can be distributed across multiple machines, networks, or other computing resources. The various components or services of the data search system 106 can also be implemented in one or more virtual machines or hosted computing environment (for example, "cloud") resources, rather than in dedicated servers. Likewise, the data repositories shown can represent local and/or remote, physical and/or logical data storage, including, for example, storage area networks or other distributed storage systems. In some embodiments, the connections between the components or services shown represent possible paths of data flow, rather than actual connections between hardware. Executable code modules that implement various functionalities of the data search system 106 can be stored in the memories of the servers 120 and/or on other types of non-transitory computer-readable storage media. While some examples of possible connections are shown, any subset of the components shown can communicate with any other subset of components in various implementations.

Example Work Flow of a One-Way Data Search

Figure 2:
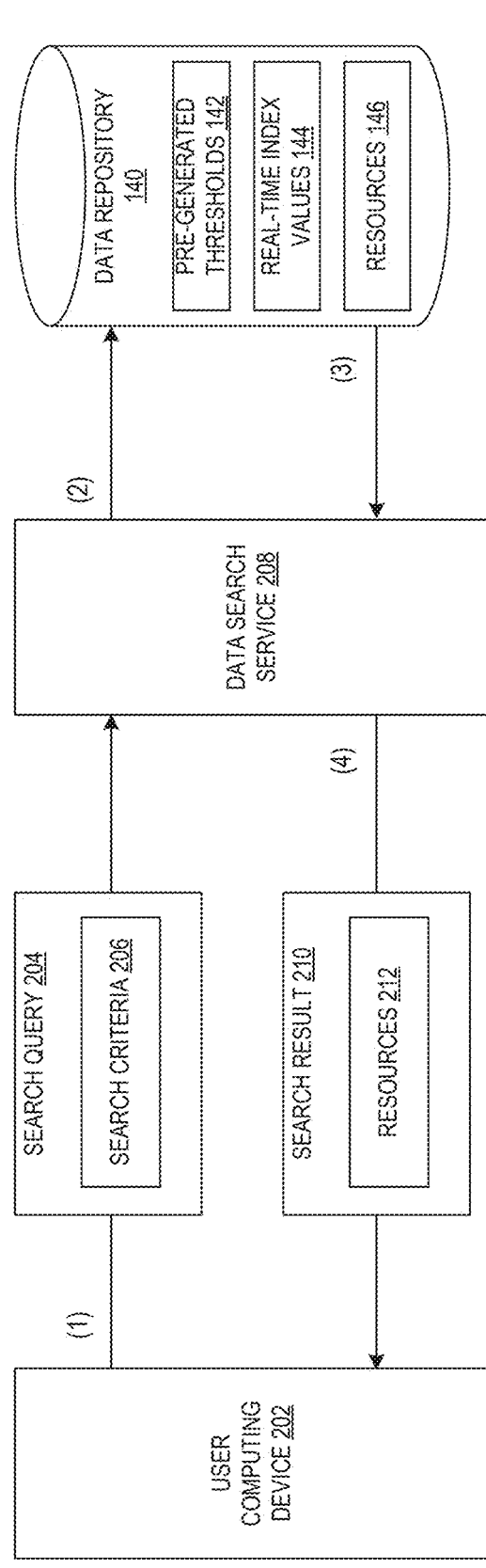
FIG. 2 depicts a block diagram illustrating an example work flow of a one-way search process, in accordance with aspects of the present disclosure.

FIG. 2 depicts a block diagram illustrating an example work flow of a one-way search process, in accordance with aspects of the present disclosure. As shown in FIG. 2, at (1), the user computing device sends a search query 204 that specifies a set of search criteria 206 to the data search service 208. For example, the user may be searching for computing resources, and the set of search criteria 206 may include the amount of computing resources needed by the user and the latency or uptime requirements of the user. As another example, the user may be searching for electronic data, and the set of search criteria 206 may include keywords that need to be included in the electronic data. As yet another example, the user may be searching for physical objects to be leased from a provider, and the set of search criteria 206 may include a description of the physical object that the user is looking for. As yet another example, the user may be searching for tasks that the user can perform on behalf of another user of the data search system 206, and the set of search criteria 206 may include a description of the tasks to be provided by the user and/or a description of the reward or payment that the user is looking to receive in return.

At (2) and (3), the data search service 208 communicates with the data repository 140 to access the pre-generated threshold 142, determine a real-time index value 144 (and store the value in the data repository 140), and identify which resources of the resources 146 should be returned. As described herein, the pre-generated threshold 142 may have been generated prior to (1) but may be identified using the search criteria 206, and the real-time index value 144 may be generated, subsequent to (1), using the search criteria 206. At (4), the data search service 208 returns a search result 210 including the identified resources 212 to the user computing device 202. Although not shown in FIG. 2, the user computing device 202 may subsequently send a resource request to the data search service 208, requesting access to one or more of the resources 212 included in the search result 210, and the data search service 208 can provide the necessary access to the user computing device 202 (or grant or deny the request as needed, with or without approval of the owner of the resources).

Example Work Flow of a Two-Way Data Search

Figure 3:
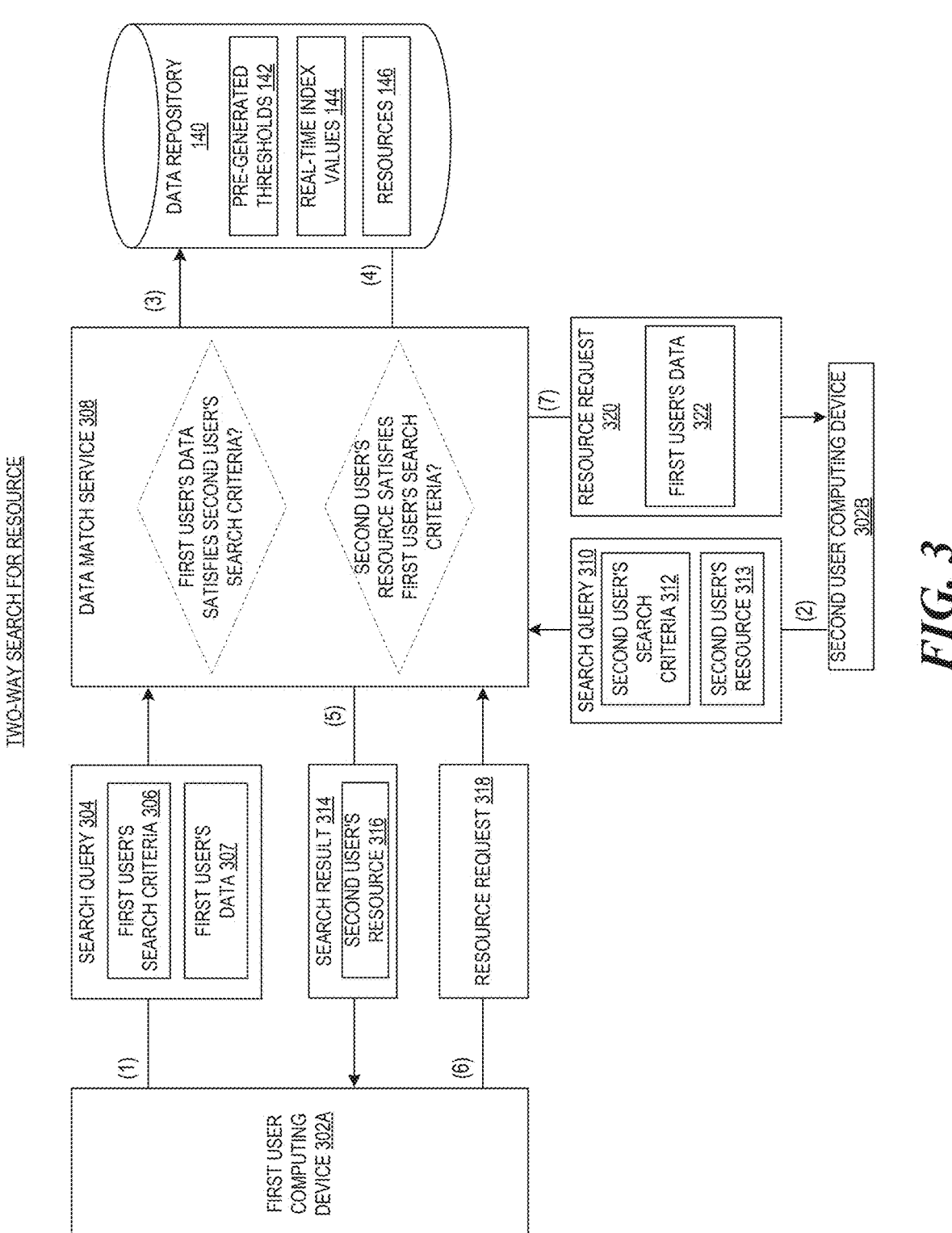
FIG. 3 depicts a block diagram illustrating an example work flow of a two-way search process, in accordance with aspects of the present disclosure.

FIG. 3 depicts a block diagram illustrating an example work flow of a two-way search process, in accordance with aspects of the present disclosure. As shown in FIG. 3, at (1), the first user computing device 302A sends a search query

304, which includes the first user's search criteria 306 and the first user's data 307, to the data match service 308. For example, the first user's search criteria 306 may include a list of keywords to be included in the electronic data that the first user is looking for, and the first user's data 307 may include the access level of the first user (e.g., different electronic data searchable via the data search system 206 may require different levels of access or authorization). As another example, the first user's search criteria 306 may include a list of tasks that the first user is willing to perform, and the first user's data 307 may include a list of qualifications of the first user. The first user's data 307 may be used by the data match service 308 to determine whether the first user is eligible to receive a given resource in the search result returned to the first user and/or whether the first user is eligible to access the given resource.

At (2), the second user computing device 302B sends a search query 310, which includes the second user's search criteria 312 and the second user's resource 313, to the data match service 308. At (3) and (4), the data match service 308 communicates with the data repository 140 to determine (i) whether the first user's data satisfies the second user's search criteria, and (ii) whether the second user's resource satisfies the first user's search criteria. Based on these determinations, at (5), the data match service 308 returns a search result 314 including the second user's resource 316 to the first user computing device 302A. In response, at (6), the first user computing device 302A sends a resource request 318, which includes an indication of user selection of the second user's resource 316 included in the search result 314, to the data match service 308. In response, at (7), the data match service 308 sends a resource request 320, which includes the first user's data 322 (which may be relevant to the decision to grant or reject the resource request 320), to the second user computing device 302B. Although not shown in FIG. 3, the second user computing device 302B may subsequently send a resource grant (or denial) request to the data match service 308, granting (or denying) the resource request 320, and the data match service 308 can relay the resource grant (or denial) request to the first user computing device 302A, notifying the first user that the resource request has been granted (or denied).

Example Routine for Outputting a Set of User-Selectable Resources

FIG. 4 depicts an illustrative routine 400 for outputting a set of user-selectable resources in response to a search request, in accordance with aspects of the present disclosure. The routine 400 may be carried out, for example, by the search service 130 or one or more other components of the data search system 106 described herein. For convenience, some or all of the steps of the routine 400 are described as being performed by the search service 130. For example, the search service 130 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the search service 130 receives, from a first user computing device, a search request to search the dataset stored in the data repository for one or more user-selectable resources that satisfy a set of search criteria specified in the search request.

At block 404, the search service 130 determines a combination of sub-criteria that falls within the set of search criteria such that a resource that satisfies the combination of sub-criteria also satisfies the set of search criteria. For example, the search criteria may indicate that the user wishes to find virtual machines to rent, and the combination of sub-criteria may be virtual machines hosted on physical servers in CA (as opposed to other states). In this example, the combination of sub-criteria is more restrictive such that any resource satisfying the combination of sub-criteria would also satisfy the search criteria specified by the search request. Another example of the combination of sub-criteria in this example may be virtual machines that are provided by provider X (as opposed to other providers) and rentable on a weekly basis (as opposed to monthly or yearly). Any virtual machine (or plan for renting virtual machines) that satisfies this combination of sub-criteria would also satisfy the search criteria specified by the search request.

At block 406, the search service 130 accesses a pre-generated threshold associated with the combination of sub-criteria, wherein the pre-generated threshold is generated for the combination of sub-criteria prior to receiving the search request and indicates the likelihood that one or more user-selectable resources to be outputted to the first user computing device in response to the search request would be selected from a set of user-selectable resources that satisfy the combination of sub-criteria. For example, if one combination of sub-criteria has a high threshold, it may indicate that the resources that satisfy the combination of sub-criteria is less likely (or more likely, depending on how the threshold is configured) to end up in the search result returned to the user. In the computing resource example, the threshold may be high due to the average cost of renting virtual machines that satisfy the combination of sub-criteria (e.g., located in an expensive area, has a high average uptime, includes faster CPUs, etc.) being high. However, another combination of sub-criteria may have a lower threshold, indicating that the resources that satisfy the combination of sub-criteria is more likely (or less likely, depending on how the threshold is configured) to end up in the search result returned to the user. Here, the threshold may be lower due to the average cost of renting virtual machines that satisfy the combination of sub-criteria (e.g., located in a less expensive area, has a lower average uptime, includes slower CPUs, etc.) being lower.

At block 408, the search service 130 determines a real-time index value associated with the combination of sub-criteria based on (i) a number of user-selectable resources in the set of user-selectable resources that satisfy the combination of sub-criteria and (ii) a number of search requests that specify search requirements that would be satisfied by the set of user-selectable resources, wherein the real-time index value indicates a degree of demand associated with the set of user-selectable resources. For example, the search service 130 may determine the real-time index value by calculating the ratio of (i) the number of user-selectable resources in the set of user-selectable resources that satisfy the combination of sub-criteria, to (ii) the number of search requests that specify search requirements that would be satisfied by the set of user-selectable resources. In some embodiments, the real-time index value and/or the pre-generated threshold may be generated at the resource level (or for a combination of all of the available sub-criteria).

At block 410, the search service 130 outputs, based on both the pre-generated threshold and the real-time index value, a first subset of user-selectable resources to the first user computing device for presentation via a user interface of the first user computing device. For example, the search service 130 may compare the pre-generated threshold and the real-time index value, and if the threshold pre-generated is greater than the real-time index value, the search service 130 may include some or all of the resources that satisfy the combination of sub-criteria in the search result to be returned to the user, and if the threshold pre-generated is not greater than the real-time index value, the search service 130 may not include any of the resources that satisfy the combination of sub-criteria in the search result to be returned to the user. In other examples, the comparison may be reversed (e.g., resources are included in the search result if the threshold is not greater than the index value). In yet other examples, the search service 130 may include some or all of the resources that satisfy the combination of sub-criteria in the search result to be returned to the user, if the threshold is within a predetermined percentage of the index value (e.g., less than the index value but not by more than 20%, greater than the index value but not by more than 20%, or within 20% of the index value), and otherwise, the search service 130 may not include any of the resources that satisfy the combination of sub-criteria in the search result to be returned to the user. Similarly, the comparison may be reversed (e.g., resources are included in the search result if the threshold is not within the predetermined percentage of the index value).

At block 412, the search service 130 detects a first user input received via the user interface that selects a first user-selectable resource from the first subset of user-selectable resources presented via the user interface.

At block 416, the search service 130 transmits, to a second user computing device, a first resource request for the first user-selectable resource on behalf of the first user computing device. The routine 400 may then end.

The routine 400 can include fewer, more, or different blocks than those illustrated in FIG. 4 and/or one or more blocks illustrated in FIG. 4 may be modified, omitted, or switched without departing from the spirit and scope of the description. Although not illustrated in FIG. 4, the search service 130 may detect an approval or a denial of the first resource request transmitted to the second user computing device, and transmit a notification to the first user computing device indicating the approval or denial, along with instructions on how to access or utilize the approved/granted first user-selectable resource, if applicable. Moreover, it will be appreciated by those skilled in the art and others that some or all of the functions described in this disclosure may be embodied in software executed by one or more processors of the data search system 106 and/or the user computing device 102 disclosed herein.

Figure 5:
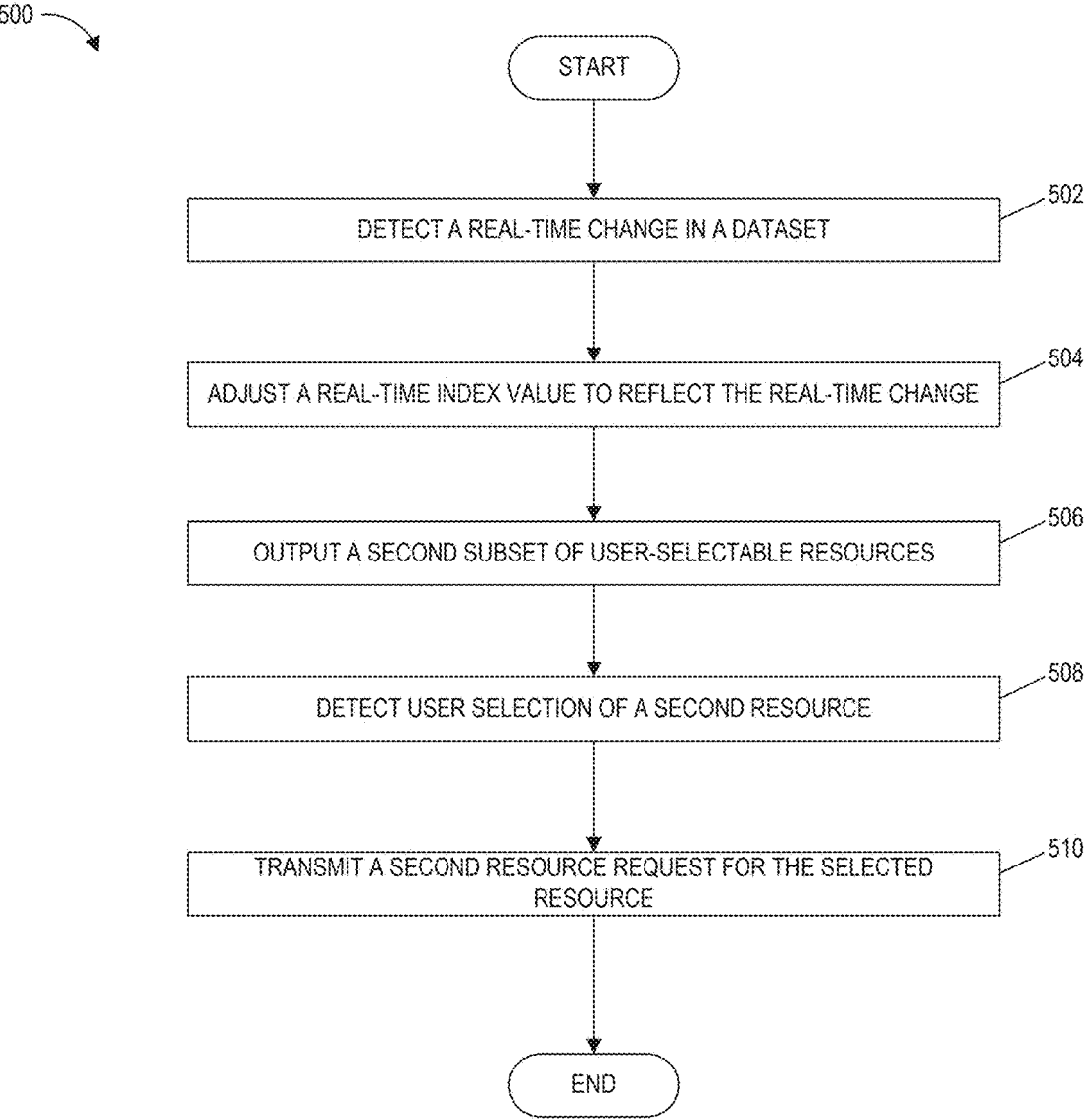
FIG. 5 is a flowchart of an example process for detecting a real-time change and outputting an updated set of user-selectable resources, in accordance with aspects of the present disclosure.

Example Routine for Detecting a Real-Time Change and Outputting an Updated Set of User-Selectable Resources FIG. 5 depicts an illustrative routine 500 for detecting a real-time change and outputting an updated set of user-selectable resources, in accordance with aspects of the present disclosure. The routine 500 may be carried out, for example, by the search service 130 or one or more other components of the data search system 106 described herein. For convenience, some or all of the steps of the routine 500 are described as being performed by the search service 130. For example, the search service 130 may include one or more hardware computing devices and non-transitory physical computer storage storing instructions that, when executed by the one or more hardware computing devices, cause the one or more hardware computing devices to perform the steps of the routine 500.

The routine 500 begins at block 502, at which the search service 130 detects a real-time change in at least one of (i) the number of user-selectable resources in the set of user-selectable resources that satisfy the combination of sub-criteria (e.g., the combination determined at block 404 of FIG. 4), or (ii) the number of search requests that specify search requirements that would be satisfied by the set of user-selectable resources. For example, the search service 130 may periodically (or upon user request or according to a schedule) determine the variables that are used to calculate the real-time index value, and detect the real-time change when those variables deviate (e.g., by a threshold amount) from the values previously used to calculate the real-time index value on behalf of a previously received search request. For example, the real-time change may occur due to (i) a greater or fewer number of resources that satisfy a certain combination of sub-criteria being available on the data search system 106 and/or (ii) a greater or fewer number of search requests looking for resources that satisfy the certain combination of sub-criteria being received by or being maintained on the data search system 106.

At block 504, the search service 130 adjusts the real-time index value to reflect the detected real-time change. In some embodiments, instead of detecting a real-time change in the underlying variables, the search service 130 detects a real-time change in the rea-time index value itself by periodically (or upon user request or according to a schedule) calculating the real-time index value for a previously received search request.

At block 506, the search service 130 outputs, based on the adjusted real-time index value and the pre-generated threshold, a second subset of user-selectable resources to the first user computing device for presentation via the user interface of the first user computing device, without receiving another search request from the first user computing device and without re-generating the pre-generated threshold.

At block 508, the search service 130 detects a second user input received via the user interface that selects a second user-selectable resource from the second subset of user-selectable resources presented via the user interface and not included in the first subset of user-selectable resources.

At block 510, the search service 130 transmits, to a third user computing device, a second resource request for the second user-selectable resource on behalf of the first user computing device. For example, the third user computing device may be operated by an owner or provider of the second resource that the first user has selected between blocks 506 and 508. The owner may be authorized to approve or deny the first user's request to utilize the second user-selectable resource. The routine 500 may then end.

The routine 500 can include fewer, more, or different blocks than those illustrated in FIG. 5 and/or one or more blocks illustrated in FIG. 5 may be modified, omitted, or switched without departing from the spirit and scope of the description. Although not illustrated in FIG. 5, the search service 130 may detect an approval or a denial of the second resource request transmitted to the third user computing device, and transmit a notification to the first user computing device indicating the approval or denial, along with instructions on how to access or utilize the approved/granted second user-selectable resource, if applicable. Moreover, it will be appreciated by those skilled in the art and others that some or all of the functions described in this disclosure may be embodied in software executed by one or more processors of the data search system 106 and/or the user computing device 102 disclosed herein.

Example Architecture of Computing System

Figure 6:
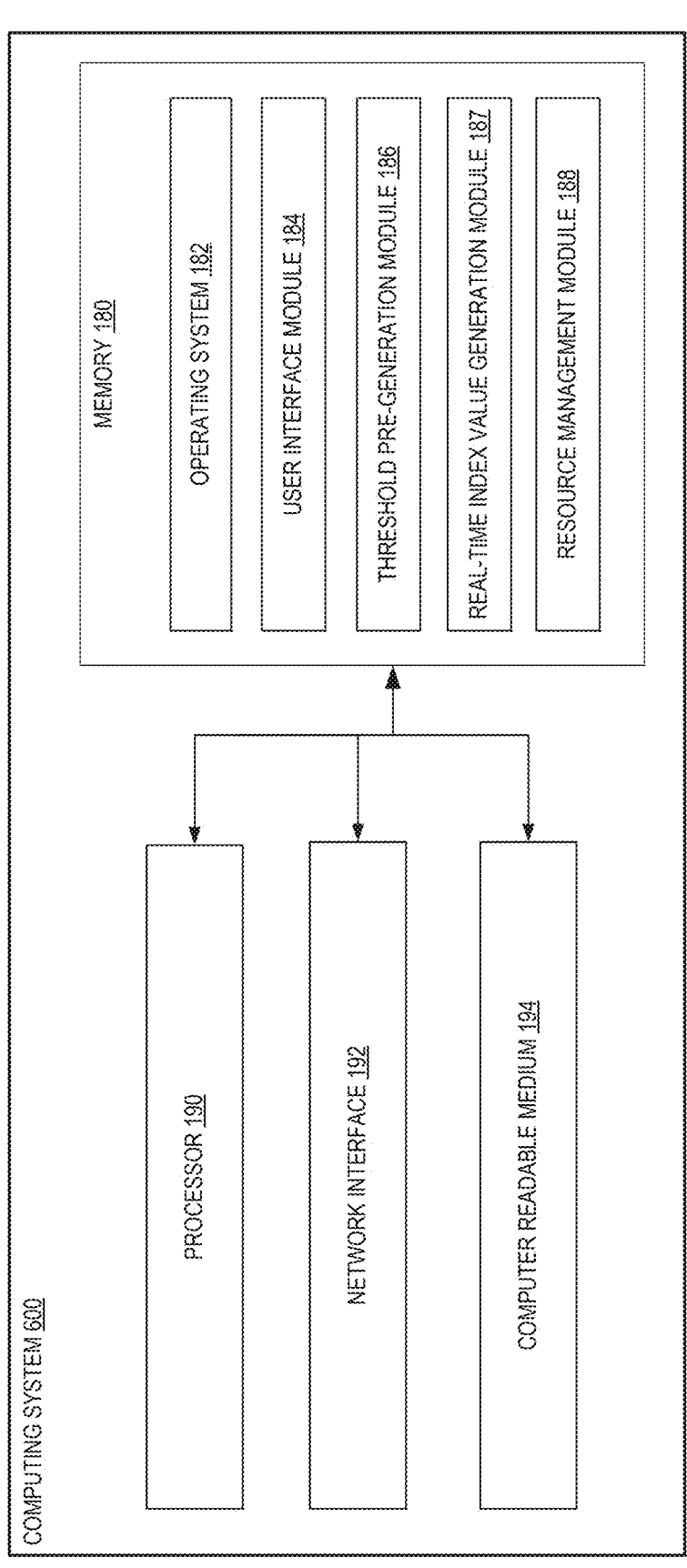
FIG. 6 depicts a general architecture of a computing system usable to implement one or more components described herein in accordance with aspects of the present disclosure.

FIG. 6 depicts an example architecture of a computing system 600 that can be used to perform one or more of the techniques described herein or illustrated in FIGS. 1-5. The general architecture of the computing system 600 depicted in FIG. 6 includes an arrangement of computer hardware and software modules that may be used to implement one or more aspects of the present disclosure. The computing system 600 may include many more (or fewer) elements than those shown in FIG. 6. It is not necessary, however, that all of these elements be shown in order to provide an enabling disclosure. For example, the computing system 600 may be used to implement one or more of the servers and/or services illustrated or described herein (e.g., data search service 130 and the data match service) and/or any of the user computing devices illustrated or described herein.

As illustrated, the computing system 600 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 600. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include various software and/or hardware modules that can be used to facilitate the operations described herein. For example, as shown in FIG. 6, the memory 180 may include a threshold pre-generation module 186, a real-time index value generation module 187, and a resource management module 188 may be executed by the processor 190. In one embodiment, the threshold pre-generation module 186 implements aspects of the present disclosure relating to threshold pre-generation (e.g., determining the combination of sub-criteria, generating a threshold for the combination of sub-criteria, etc.), the real-time index value generation module 187 implements aspects of the present disclosure relating to real-time index value generation (e.g., generating a real-time index value for a combination of sub-criteria, detecting a real-time change to the underlying dataset, and adjusting the real-time index value for the combination of sub-criteria), and the resource management module 188 implements aspects of the present disclosure relating to resource management (e.g., identifying resources that satisfy a user's criteria, outputting the resources to the user, and transmitting request for such resources on behalf of the user).

Although a single processor, a single network interface, a single computer-readable medium, and a single memory are illustrated in the example of FIG. 6, in other implementations, the computing system 600 can have a multiple of one or more of these components (e.g., two or more processors and/or two or more memories).

Enumerated Implementations (EIs)

Some examples of enumerated implementations (EIs) are provided in this section, without limitation.

EI 1: A system for facilitating data searches, the system comprising: a data repository storing a dataset that includes a plurality of user-selectable resources; and a data search service comprising computer hardware, wherein the data search service is configured to at least: receive, from a first user computing device, a search request to search the dataset stored in the data repository for one or more user-selectable resources that satisfy a set of search criteria specified in the search request; determine a combination of sub-criteria that falls within the set of search criteria such that a resource that satisfies the combination of sub-criteria also satisfies the set of search criteria; access a pre-generated threshold associated with the combination of sub criteria, wherein the pre-generated threshold is generated for the combination of sub-criteria prior to receiving the search request and indicates a likelihood of selecting, from a set of user-selectable resources that satisfy the combination of sub-criteria, the one or more user-selectable resources to be outputted to the first user computing device in response to the search request; determine a real-time index value associated with the combination of sub criteria based on (i) a number of user-selectable resources in the set of user-selectable resources that satisfy the combination of sub-criteria and (ii) a number of search requests that specify search requirements that would be satisfied by the set of user-selectable resources, wherein the real-time index value indicates a degree of demand associated with the set of user-selectable resources; output, based on both the pre-generated threshold and the real-time index value, a first subset of user-selectable resources to the first user computing device for presentation via a user interface of the first user computing device; detect a first user input received via the user interface that selects a first user-selectable resource from the first subset of user-selectable resources presented via the user interface; transmit, to a second user computing device, a first resource request for the first user-selectable resource on behalf of the first user computing device; detect a real-time change in at least one of (i) the number of user-selectable resources in the set of user-selectable resources that satisfy the combination of sub-criteria, or (ii) the number of search requests that specify search requirements that would be satisfied by the set of user-selectable resources; adjust the real-time index value to reflect the detected real-time change; output, based on the adjusted real-time index value and the pre-generated threshold, a second subset of user-selectable resources to the first user computing device for presentation via the user interface of the first user computing device, without receiving another search request from the first user computing device and without re-generating the pre-generated threshold; detect a second user input received via the user interface that selects a second user-selectable resource from the second subset of user-selectable resources presented via the user interface and not included in the first subset of user-selectable resources; and transmit, to a third user computing device, a second resource request for the second user-selectable resource on behalf of the first user computing device.

EI 2: The system of EI 1, wherein the data search service is further configured to determine the first subset of user-selectable resources at least by comparing the pre-generated threshold and the real-time index to determine whether the real-time index has reached or exceeded the pre-generated threshold.

EI 3: The system of EI 1, wherein the data search service is further configured to periodically update the pre-generated threshold.

EI 4: The system of EI 1, wherein the data search service is further configured to determine a plurality of different combinations of sub-criteria and pre-generate a threshold for each one of the plurality of different combinations of sub-criteria such that any one of the pre-generated thresholds is usable to identify user-selectable resources in response to one or more future search requests.

EI 5: The system of EI 1, wherein the data search service is further configured to transmit, to the first user computing device, that the first resource request previously transmitted to the second user computing device has been granted.

EI 6: The system of EI 1, wherein the search request further specifies user data associated with the first user computing device.

EI 7: The system of EI 6, wherein the first subset of user-selectable resources each include a set of criteria, the data search service further configured to determine that, for each user-selectable resource in the first subset of user-selectable resources, the user data associated with the first user computing device satisfies the respective set of criteria.

EI 8: A computer-implemented method for facilitating data searches, the method comprising: receiving, from a first user computing device, a search request to search a dataset for one or more user-selectable resources that satisfy a set of search criteria specified in the search request; determining a combination of sub-criteria that falls within the set of search criteria such that a resource that satisfies the combination of sub-criteria also satisfies the set of search criteria; accessing a pre-generated threshold associated with the combination of sub criteria, wherein the pre-generated threshold is generated for the combination of sub-criteria prior to receiving the search request and indicates a likelihood of selecting, from a set of user-selectable resources that satisfy the combination of sub-criteria, the one or more user-selectable resources to be outputted to the first user computing device in response to the search request; determining a real-time index value associated with the combination of sub criteria based on (i) a number of user-selectable resources in the set of user-selectable resources that satisfy the combination of sub-criteria and (ii) a number of search requests that specify search requirements that would be satisfied by the set of user-selectable resources, wherein the real-time index value indicates a degree of demand associated with the set of user-selectable resources; outputting, based on both the pre-generated threshold and the real-time index value, a first subset of user-selectable resources to the first user comput-ing device for presentation via a user interface of the first user computing device; detecting a first user input received via the user interface that selects a first user-selectable resource from the first subset of user-selectable resources presented via the user interface; transmitting, to a second user computing device, a first resource request for the first user-selectable resource on behalf of the first user computing device; detecting a real-time change in at least one of (i) the number of user-selectable resources in the set of user-selectable resources that satisfy the combination of sub-criteria, or (ii) the number of search requests that specify search requirements that would be satisfied by the set of user-selectable resources; adjusting the real-time index value to reflect the detected real-time change; outputting, based on the adjusted real-time index value and the pre-generated threshold, a second subset of user-selectable resources to the first user computing device for presentation via the user interface of the first user computing device, without receiving another search request from the first user computing device and without re-generating the pre-gener-ated threshold; detecting a second user input received via the user interface that selects a second user-selectable resource from the second subset of user-selectable resources pre-sented via the user interface and not included in the first subset of user-selectable resources; and transmitting, to a third user computing device, a second resource request for the second user-selectable resource on behalf of the first user computing device.

EI 9: The computer-implemented method of EI 8, further comprising determining the first subset of user-selectable resources at least by comparing the pre-generated threshold and the real-time index to determine whether the real-time index has reached or exceeded the pre-generated threshold.

EI 10: The computer-implemented method of EI 8, further comprising periodically updating the pre-generated thresh-old.

EI 11: The computer-implemented method of EI 8, further comprising determining a plurality of different combinations of sub-criteria and pre-generate a threshold for each one of the plurality of different combinations of sub-criteria such that any one of the pre-generated thresholds is usable to identify user-selectable resources in response to one or more future search requests.

EI 12: The computer-implemented method of EI 8, further comprising transmitting, to the first user computing device, that the first resource request previously transmitted to the second user computing device has been granted.

EI 13: The computer-implemented method of EI 8, wherein the search request further specifies user data asso-ciated with the first user computing device.

EI 14: The computer-implemented method of EI 13, wherein the first subset of user-selectable resources each include a set of criteria, the computer-implemented method further comprising determining that, for each user-selectable resource in the first subset of user-selectable resources, the user data associated with the first user computing device satisfies the respective set of criteria.

EI 15: A method for matching candidates to jobs, the method comprising: receiving jobs data from a plurality of sources of job postings, wherein the jobs data indicates a plurality of jobs that are each associated with one of a plurality of geographical areas and one or more of a plurality of specialty categories indicative of the nature of the work to be performed for the job; receiving candidate data from a plurality of candidates, wherein the candidate data indicates, for each candidate of the plurality of candidates, (i) location preferences, (ii) pay preferences, (iii) specialty preferences, and (iv) qualifications; providing a first dataset comprising a plurality of pre-generated job suggestion threshold values including a first pre-generated job suggestion threshold value, wherein the first pre-generated job suggestion thresh-old value included in the first dataset is associated with a first specialty category of the plurality of specialty categories and a first geographical area of the plurality of geographical areas, and is usable to determine a desirability of suggesting a job in the first specialty category from the first geographi-cal area, wherein the first pre-generated job suggestion threshold value is based at least on (i) a cost of living in the first geographical area and (ii) an average pay for jobs in the first specialty category in the first geographical area; pro-viding a second dataset comprising a plurality of supply-and-demand index values including a first supply-and-demand index value, wherein the first supply-and-demand index value indicates a relationship between a number of available jobs in the first specialty category from the first geographical area and a number of candidates considering the available jobs in the first specialty category from the first geographical area; receiving new candidate data from a new candidate, wherein the new candidate data indicates location preferences, pay preferences, specialty preferences, and qualifications of the new candidate, wherein the location preferences of the new candidate indicate that the new candidate is willing to consider jobs in the first geographical area, and the qualifications of the new candidate indicate that the new candidate is qualified to apply for jobs in the first specialty category; accessing the first pre-generated job suggestion threshold value included in the first dataset; accessing the first supply-and-demand index value included in the second dataset; based on a comparison between the first pre-generated job suggestion threshold value and the first supply-and-demand index value, outputting a real-time notification including at least a first matching job of the plurality of jobs that is in the first specialty category and from the first geographical area, wherein the real-time notification indicates a pay of the first matching job and an institution name of the first matching job; in response to real-time changes in the number of available jobs in the first specialty category from the first geographical area and the number of candidates considering the available jobs, adjusting the first supply-and-demand index value; and based on a comparison between the first pre-generated job suggestion threshold value and the adjusted first supply-and-demand index value, outputting a follow-up notification including an additional matching job in the first specialty category from the first geographical area, wherein the additional matching job was not previously suggested to the new candidate.

EI 16: A non-transitory computer readable medium storing instructions that, when executed by a computing system, cause the computing system to perform operations comprising: receiving, from a first user computing device, a search request to search a dataset for one or more user-selectable resources that satisfy a set of search criteria specified in the search request; determining a combination of sub-criteria that falls within the set of search criteria such that a resource that satisfies the combination of sub-criteria also satisfies the set of search criteria; accessing a pre-generated threshold associated with the combination of sub criteria, wherein the pre-generated threshold is generated for the combination of sub-criteria prior to receiving the search request and indicates a likelihood of selecting, from a set of user-selectable resources that satisfy the combination of sub-criteria, the one or more user-selectable resources to be outputted to the first user computing device in response to the search request; determining a real-time index value associated with the combination of sub criteria based on (i) a number of user-selectable resources in the set of user-selectable resources that satisfy the combination of sub-criteria and (ii) a number of search requests that specify search requirements that would be satisfied by the set of user-selectable resources, wherein the real-time index value indicates a degree of demand associated with the set of user-selectable resources; outputting, based on both the pre-generated threshold and the real-time index value, a first subset of user-selectable resources to the first user computing device for presentation via a user interface of the first user computing device; detecting a first user input received via the user interface that selects a first user-selectable resource from the first subset of user-selectable resources presented via the user interface; transmitting, to a second user computing device, a first resource request for the first user-selectable resource on behalf of the first user computing device; detecting a real-time change in at least one of (i) the number of user-selectable resources in the set of user-selectable resources that satisfy the combination of sub-criteria, or (ii) the number of search requests that specify search requirements that would be satisfied by the set of user-selectable resources; adjusting the real-time index value to reflect the detected real-time change; outputting, based on the adjusted real-time index value and the pre-generated threshold, a second subset of user-selectable resources to the first user computing device for presentation via the user interface of the first user computing device, without receiving another search request from the first user computing device and without re-generating the pre-generated threshold; detecting a second user input received via the user interface that selects a second user-selectable resource from the second subset of user-selectable resources presented via the user interface and not included in the first subset of user-selectable resources; and transmitting, to a third user computing device, a second resource request for the second user-selectable resource on behalf of the first user computing device.

EI 17: The non-transitory computer readable medium of EI 16, storing further instructions that, when executed by the computing system, cause the computing system to perform operations comprising determining the first subset of user-selectable resources at least by comparing the pre-generated threshold and the real-time index to determine whether the real-time index has reached or exceeded the pre-generated threshold.

EI 18: The non-transitory computer readable medium of EI 16, storing further instructions that, when executed by the computing system, cause the computing system to perform operations comprising periodically updating the pre-generated threshold.

EI 19: The non-transitory computer readable medium of EI 16, storing further instructions that, when executed by the computing system, cause the computing system to perform operations comprising determining a plurality of different combinations of sub-criteria and pre-generate a threshold for each one of the plurality of different combinations of sub-criteria such that any one of the pre-generated thresholds is usable to identify user-selectable resources in response to one or more future search requests.

EI 20: The non-transitory computer readable medium of EI 16, storing further instructions that, when executed by the computing system, cause the computing system to perform operations comprising transmitting, to the first user computing device, that the first resource request previously transmitted to the second user computing device has been granted.

EI 21: The non-transitory computer readable medium of EI 16, wherein the search request further specifies user data associated with the first user computing device, and the first subset of user-selectable resources each include a set of criteria, the non-transitory computer readable medium storing further instructions that, when executed by the computing system, cause the computing system to perform operations comprising determining that, for each user-selectable resource in the first subset of user-selectable resources, the user data associated with the first user computing device satisfies the respective set of criteria.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "set" is used to include "one or more." For example, a set of objects may include a single object or multiple objects.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
one or more processors; and
one or more memories having stored thereon instructions, which, when executed by the one or more processors, cause the one or more processors to:
    receive, from a computing device, a search request to search a data repository for one or more user-selectable resources, wherein the data repository stores a plurality of user-selectable resources;
    determine a threshold associated with a combination of sub-criteria based at least in part on a set of search criteria corresponding to the search request;
    determine an index value that indicates a degree of demand associated with a set of user-selectable resources that satisfy the combination of sub-criteria;
    output, based on comparing the threshold associated with the combination of sub-criteria and the index value associated with the combination of sub-criteria, a first subset of user-selectable resources;
    detect a first user input that selects a first user-selectable resource from the first subset of user-selectable resources presented via a user interface;
    output a first resource request for the first user-selectable resource;
    detect a change in (i) a number of user-selectable resources in the set of user-selectable resources that satisfy the combination of sub-criteria, or (ii) a number of search requests that specify search requirements that would be satisfied by the set of user-selectable resources;
    adjust the index value associated with the combination of sub-criteria to reflect the detected change; and
    output, based on comparing the adjusted index value and the threshold associated with the combination of sub-criteria, a second subset of user-selectable resources without receiving another search request from the computing device specifying the set of search criteria.

2. The system of claim 1, wherein the instructions further cause the one or more processors to:
    detect a second user input that selects a second user-selectable resource from the second subset of user-selectable resources, wherein the second user-selectable resource is not included in the first subset of user-selectable resources; and
    output a second resource request for the second user-selectable resource.

3. The system of claim 1, wherein the instructions further cause the one or more processors to determine the first subset of user-selectable resources at least by determining whether the index value has reached or exceeded the threshold.

4. The system of claim 1, wherein the instructions further cause the one or more processors to periodically update the threshold associated with the combination of sub-criteria.

5. The system of claim 1, wherein the instructions further cause the one or more processors to determine a plurality of different combinations of sub-criteria and pre-generate a threshold for each one of the plurality of different combinations of sub-criteria such that any one of the thresholds is usable to identify user-selectable resources in response to one or more future search requests.

6. The system of claim 1, wherein the instructions further cause the one or more processors to output an indication that the first resource request has been granted.

7. The system of claim 1, wherein each user-selectable resource in the first subset of user-selectable resources includes a set of criteria, the instructions further causing the one or more processors to determine that, for each user-selectable resource in the first subset of user-selectable resources, user data associated with the search request.

8. A computer-implemented method comprising:
receiving, by a computer system, a search request to search a data repository for one or more user-selectable resources, wherein the data repository stores a plurality of user-selectable resources;
determining, by the computer system, a threshold associated with a combination of sub-criteria based at least in part on a set of search criteria corresponding to the search request;
determining, by the computer system, an index value that indicates a degree of demand associated with a set of user-selectable resources that satisfy the combination of sub-criteria;
outputting, by the computer system, based on comparing the threshold associated with the combination of sub-criteria and the index value associated with the combination of sub-criteria, a first subset of user-selectable resources;
detecting a first user input received via the user interface that selects a first user-selectable resource from the first subset of user-selectable resources presented via a user interface;
outputting, by the computer system, a first resource request for the first user-selectable resource;
detecting a change in (i) a number of user-selectable resources in the set of user-selectable resources that satisfy the combination of sub-criteria, or (ii) e a number of search requests that specify search requirements that would be satisfied by the set of user-selectable resources;

adjusting, by the computer system, the index value associated with the combination of sub-criteria to reflect the detected change; and outputting, by the computer system, based on comparing the adjusted index value and the threshold associated with the combination of sub-criteria, a second subset of user-selectable resources without receiving another search request specifying the set of search criteria.

9. The computer-implemented method of claim 8, further comprising:

detecting, by the computer system, a second user input that selects a second user-selectable resource from the second subset of user-selectable resources, wherein the second user-selectable resource is not included in the first subset of user-selectable resources; and outputting, by the computer system, a second resource request for the second user-selectable resource.

10. The computer-implemented method of claim 8, further comprising determining the first subset of user-selectable resources at least by determining whether the index value has reached or exceeded the threshold.

11. The computer-implemented method of claim 8, further comprising periodically updating the threshold associated with the combination of sub-criteria.

12. The computer-implemented method of claim 8, further comprising determining a plurality of different combinations of sub-criteria and pre-generate a threshold for each one of the plurality of different combinations of sub-criteria such that any one of the thresholds is usable to identify user-selectable resources in response to one or more future search requests.

13. The computer-implemented method of claim 8, further comprising outputting an indication that the first resource request has been granted.

14. The computer-implemented method of claim 8, wherein each user-selectable resource in the first subset of user-selectable resources includes a set of criteria, the computer-implemented method further comprising determining that, for each user-selectable resource in the first subset of user-selectable resources, user data associated with the search request satisfies the set of criteria.

15. A non-transitory computer-readable medium storing instructions that, when executed by a computing system, cause the computing system to perform operations comprising:

receiving, from a computing device, a search request to search a data repository for one or more user-selectable resources, wherein the data repository stores a plurality of user-selectable resources;

determining a threshold associated with a combination of sub-criteria based at least in part on a set of search criteria corresponding to the search request;

determining an index value that indicates a degree of demand associated with the set of user-selectable resources;

outputting, based on comparing the threshold associated with the combination of sub-criteria and the index value associated with the combination of sub-criteria, a first subset of user-selectable resources;

detecting a first user input received via the user interface that selects a first user-selectable resource from the first subset of user-selectable resources presented via the user interface;

outputting a first resource request for the first user-selectable resource;

detecting a change in (i) a number of user-selectable resources in the set of user-selectable resources that satisfy the combination of sub-criteria, or (ii) a number of search requests that specify search requirements that would be satisfied by the set of user-selectable resources;

adjusting the index value associated with the combination of sub-criteria to reflect the detected change; and outputting, based on comparing the adjusted index value and the threshold associated with the combination of sub-criteria, a second subset of user-selectable resources without receiving another search request from the computing device specifying the set of search criteria.

16. The non-transitory computer-readable medium of claim 15, storing further instructions that, when executed by the computing system, cause the computing system to perform operations comprising:

detecting a second user input that selects a second user-selectable resource from the second subset of user-selectable resources, wherein the second user-selectable resource is not included in the first subset of user-selectable resources; and outputting a second resource request for the second user-selectable resource.

17. The non-transitory computer-readable medium of claim 15, storing further instructions that, when executed by the computing system, cause the computing system to perform operations comprising determining the first subset of user-selectable resources at least by determining whether the index value has reached or exceeded the threshold.

18. The non-transitory computer-readable medium of claim 15, storing further instructions that, when executed by the computing system, cause the computing system to perform operations comprising determining a plurality of different combinations of sub-criteria and pre-generate a threshold for each one of the plurality of different combinations of sub-criteria such that any one of the thresholds is usable to identify user-selectable resources in response to one or more future search requests.

19. The non-transitory computer-readable medium of claim 15, storing further instructions that, when executed by the computing system, cause the computing system to perform operations comprising outputting an indication that the first resource request has been granted.

20. The non-transitory computer-readable medium of claim 15, wherein each user-selectable resource in the first subset of user-selectable resources includes a set of criteria, the non-transitory computer-readable medium storing further instructions that, when executed by the computing system, cause the computing system to perform operations comprising determining that, for each user-selectable resource in the first subset of user-selectable resources, user data associated with the search request satisfies the set of criteria.

* * * * *